United States Patent
King et al.

(10) Patent No.: US 9,065,960 B2
(45) Date of Patent: Jun. 23, 2015

(54) SYSTEM FOR NON-UNIFORMLY ILLUMINATING AN ORIGINAL AND CAPTURING AN IMAGE THEROF

(75) Inventors: Anthony Michael King, Lexington, KY (US); Mark Eric Miller, Versailles, KY (US); Ronald Todd Sellers, Stamping Ground, KY (US)

(73) Assignee: Lexmark International, Inc., Lexington, KY (US)

( * ) Notice: Subject to any disclaimer, the term of this patent is extended or adjusted under 35 U.S.C. 154(b) by 1551 days.

(21) Appl. No.: 12/624,921

(22) Filed: Nov. 24, 2009

(65) Prior Publication Data

US 2011/0122460 A1    May 26, 2011

(51) Int. Cl.
*H04N 1/04* (2006.01)
*H04N 1/46* (2006.01)
*H04N 1/028* (2006.01)
*H04N 1/10* (2006.01)

(52) U.S. Cl.
CPC ....... *H04N 1/02815* (2013.01); *H04N 1/02885* (2013.01); *H04N 1/10* (2013.01); *H04N 2201/0081* (2013.01); *H04N 2201/02495* (2013.01)

(58) Field of Classification Search
CPC .............. H04N 1/02815; H04N 1/193; H04N 1/40056; H04N 1/1013; H04N 1/0287
See application file for complete search history.

(56) References Cited

U.S. PATENT DOCUMENTS

| | | | | |
|---|---|---|---|---|
| 5,767,979 A * | 6/1998 | Kim | | 358/296 |
| 6,188,527 B1 * | 2/2001 | Bohn | | 359/710 |
| 7,202,888 B2 * | 4/2007 | Tecu et al. | | 348/208.11 |
| 7,274,495 B2 * | 9/2007 | Tseng | | 358/484 |
| 7,697,762 B2 * | 4/2010 | Tatsuno | | 382/190 |
| 7,746,517 B2 * | 6/2010 | Miller et al. | | 358/474 |
| 8,154,775 B2 * | 4/2012 | Jeong et al. | | 358/474 |
| 8,264,750 B2 * | 9/2012 | Takeuchi | | 358/475 |
| 8,559,074 B2 * | 10/2013 | Keniston et al. | | 358/475 |
| 2008/0180754 A1 * | 7/2008 | Miller et al. | | 358/474 |
| 2009/0002774 A1 * | 1/2009 | King et al. | | 358/474 |
| 2010/0079983 A1 * | 4/2010 | Kumamoto | | 362/147 |
| 2010/0118327 A1 * | 5/2010 | Caspar et al. | | 358/1.13 |
| 2011/0122465 A1 * | 5/2011 | King et al. | | 358/509 |
| 2012/0243054 A1 * | 9/2012 | Sellers | | 358/448 |
| 2012/0263395 A1 * | 10/2012 | Sellers et al. | | 382/275 |

* cited by examiner

*Primary Examiner* — Cheukfan Lee
(74) *Attorney, Agent, or Firm* — John Victor Pezdek (57) ABSTRACT

An imaging device having an imaging unit for illuminating and capturing an original positioned on the imaging surface. The imaging surface is illuminated by an illumination system including a plurality of light sources that non-uniformly illuminates the imaging surface such that the corner areas of imaging surface is illuminated more than the non-corner areas of the imaging surface. In one embodiment the light sources are arranged around the perimeter of the imaging surface. In an alternate embodiment the light sources are located outside the field of view of a lens of the image capturing unit.

20 Claims, 7 Drawing Sheets

SYSTEM FOR NON-UNIFORMLY ILLUMINATING AN ORIGINAL AND CAPTURING AN IMAGE THEROF

BACKGROUND

1. Field of the Invention

The present invention relates generally to scanners and scanning methods, and more particularly to those permitting capture of image of an original positioned on the imaging surface that is illuminated by light sources that illuminate the corner areas of the imaging surface more brightly than the non-corner areas of the imaging surface.

2. Description of the Related Art

Scanning devices are used in a variety of applications. Scanning devices may be combined in an all-in-one unit that includes scanning, printing, and facsimile functions or may each be used independently. A conventional scanning device has an illumination system to illuminate the original that is to be scanned and an imaging unit for capturing the image of the illuminated original.

Often it is advantageous to reduce the size of the scanning device. One way of reducing the size of the scanning device is by placing the imaging unit of the imaging device close to the imaging surface. However, as a lens of the imaging unit gets closer to the imaging surface, the light from the outer edges of the imaging surface has significantly farther to travel to reach the lens of the imaging unit compared to the light from a non-corner portion of the imaging surface. This causes the image of original positioned near the corner portion of the imaging surface to appear less illuminated compared to the image of original positioned near the non-corner portion of the imaging surface. This is referred to as vignetting or roll-off effect that causes the corner of the original to seem darker than the rest of the original.

Therefore, it would be advantageous to have a scanning device that captures an image devoid of any undesirable darkness at the edges, thereby addressing the problem of vignetting and providing an output image with improved quality.

SUMMARY OF THE INVENTION

Disclosed herein is a system for non-uniformly illuminating and imaging an original in an imaging device that includes an imaging surface for holding the original, the imaging surface having a perimeter, corner areas, and non-corner areas, an imaging member for capturing an image of the illuminated original placed on the imaging surface, a plurality of light sources arranged around the perimeter of the imaging surface for illuminating the original placed on the imaging surface, the plurality of light sources illuminating the corner areas of the imaging surface sufficiently to achieve a photo response non-uniformity (PRNU) level of between 10% and 50% at the imaging member, and a lens disposed below the imaging surface and above the imaging member, the lens having a field of view angle equal to or greater than 50 degrees and focal length equal to or greater than 200 mm and less than 500 mm.

In some embodiments, the plurality of light sources include a first plurality of light sources illuminating the corner areas of the imaging surface and a second plurality of light sources illuminating the non-corner areas of the imaging surface, the first plurality of light sources having a higher number of light sources compared to the second plurality of light sources.

In another embodiment, the plurality of light sources include a first plurality of light sources illuminating the corner areas of the imaging surface and a second plurality of light sources illuminating the non-corner areas of the imaging surface, the first plurality of light sources having a first lumens output greater than the second plurality of light sources having a second lumens output.

In another embodiment, the plurality of light sources is capable of being focused to a particular location of the imaging surface.

In another aspect, a system for non-uniformly illuminating and imaging an original in an imaging device is disclosed that includes an imaging surface for holding the original, the imaging surface having a perimeter, corner areas, and non-corner areas, a lens positioned below the imaging surface, the lens having a field of view that includes an entire area of the imaging surface, a plurality of light sources disposed adjacent the imaging surface outside the field of view of the lens, the plurality of light sources oriented towards the imaging surface for illuminating the original placed on the imaging surface, an imaging member positioned below the lens for capturing an image of the illuminated original placed on the imaging surface, and a lens positioned on the plurality of light sources and operative to diverge light from the light source to illuminate the corner areas of the imaging surface sufficiently to achieve a photo response non-uniformity (PRNU) level of between 10% and 50% at the imaging member.

In yet another aspect, a method for non-uniformly illuminating and imaging an original in an imaging device is disclosed that includes positioning the original on an imaging surface having a perimeter, corner areas, and non-corner areas, illuminating the original using a plurality of light sources arranged around the perimeter of the imaging surface, and capturing an illuminated image of the original, the plurality of light sources illuminating the corner areas of the imaging surface sufficiently to achieve a photo response non-uniformity (PRNU) level of between 10% and 50% at the imaging member.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and together with the description serve to explain the principles and operation of the invention.

BRIEF DESCRIPTION OF THE DRAWINGS

The above-mentioned and other features and advantages of the various embodiments of the invention, and the manner of attaining them, will become more apparent will be better understood by reference to the accompanying drawings, wherein.

DETAILED DESCRIPTION

Reference will now be made in detail to the exemplary embodiment(s) of the invention, as illustrated in the accompanying drawings. Whenever possible, the same reference numerals will be used throughout the drawings to refer to the same or like parts.

Figure 1:
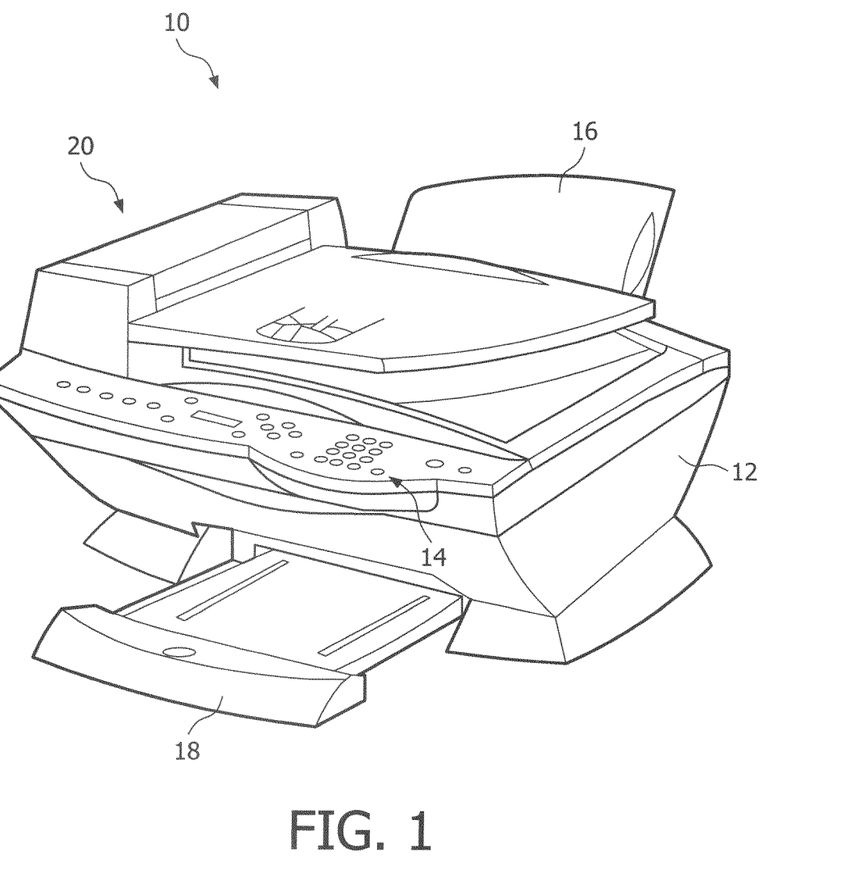
FIG. 1 is a perspective view of a scanning device according to one embodiment of the present invention.

FIG. 1 illustrates one embodiment of an imaging device according to the present invention, of which the imaging device is a scanning device 10. The scanning device 10 preferably has both scanning and printing capabilities. The scanning device 10 comprises an exterior housing 12, a user interface 14, at least one media input tray 16 adapted to hold a stack of print media, a media output tray 18, and a document handler 20. Additional interior components for performing functions of printing and scanning are not visible in the exterior view illustrated in FIG. 1.

Figure 2:
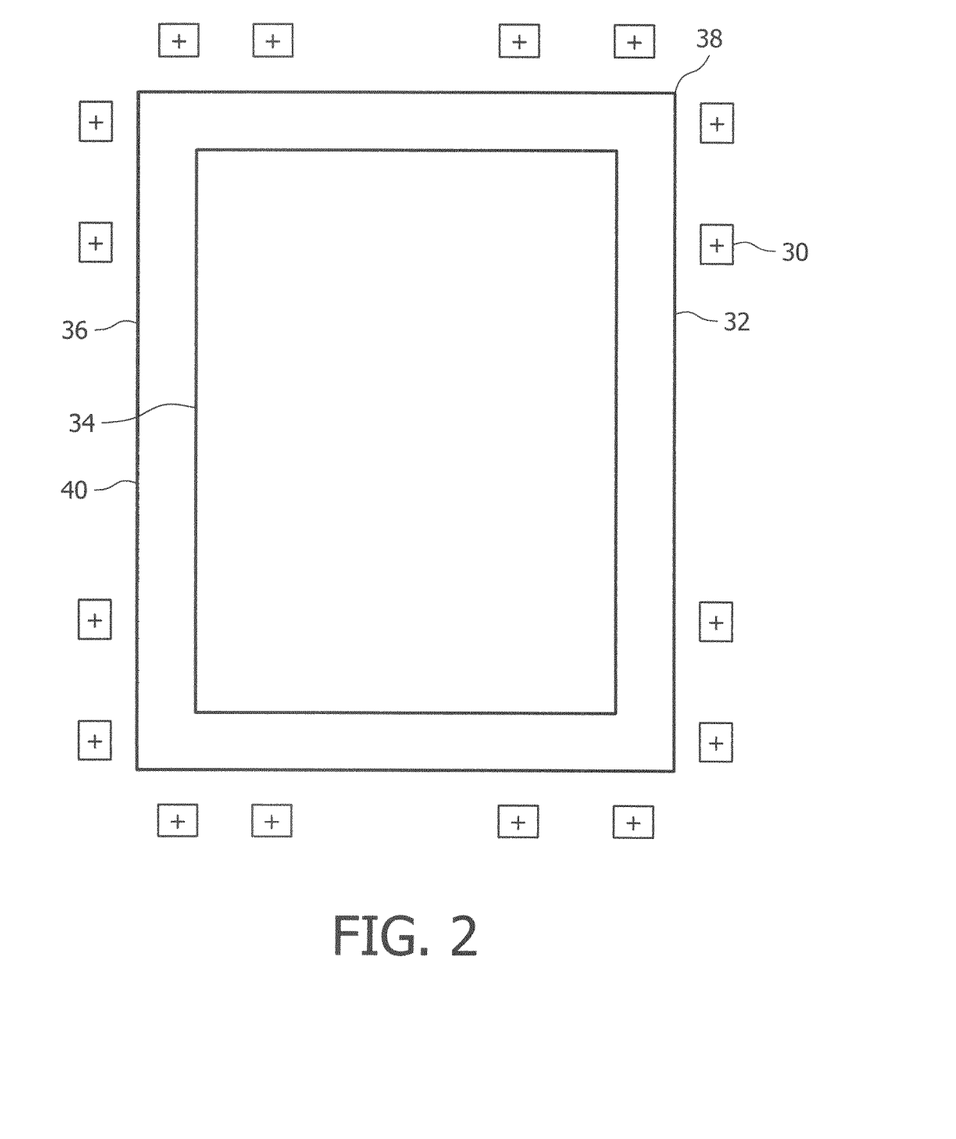
FIG. 2 is a schematic diagram of light sources arranged around the corners of the imaging surface according to one embodiment of the present invention.
Figure 3:
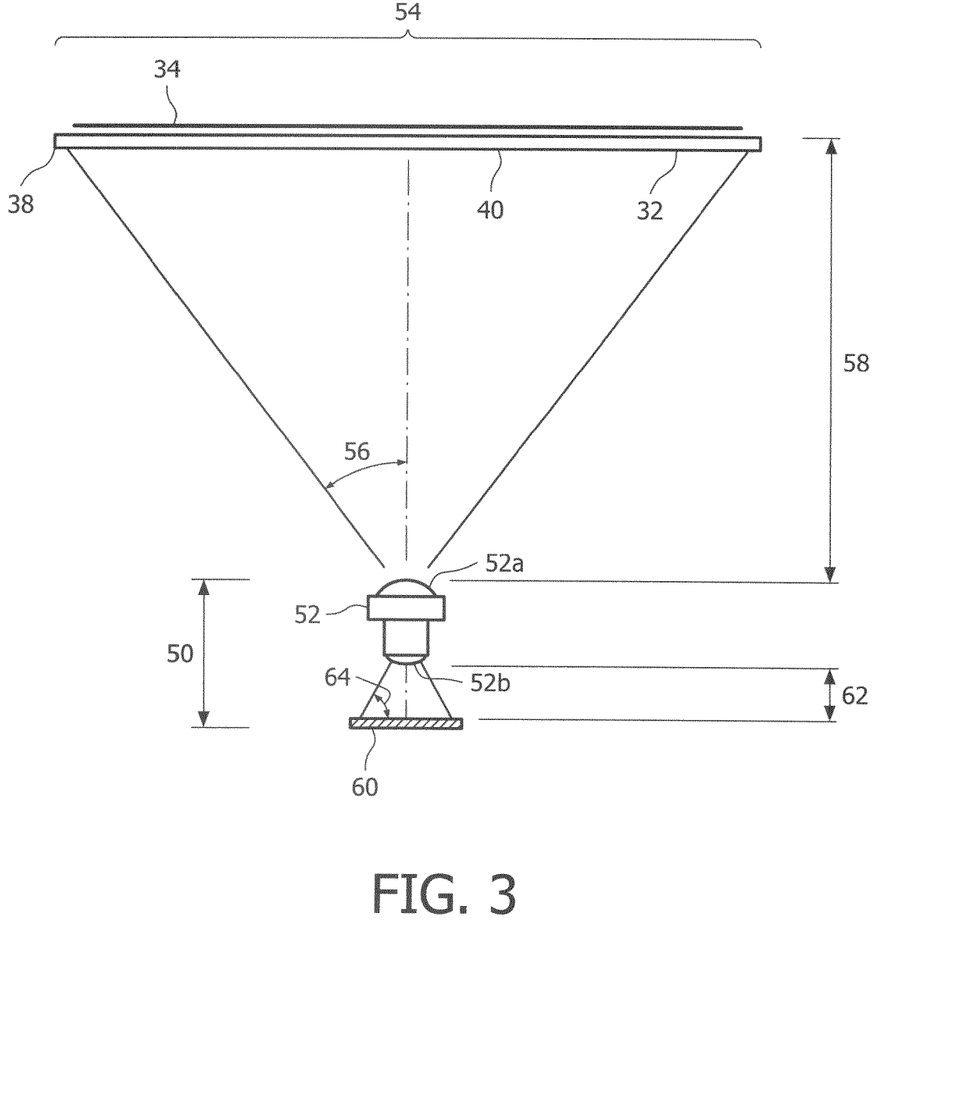
FIG. 3 is a schematic diagram of an imaging unit according to one embodiment of the present invention.

FIG. 2 illustrates one embodiment of an arrangement of light sources 30 arranged around an imaging surface 32 of the scanning device 10 holding an original 34. The area around the boundary of the imaging surface 32 forms a perimeter 36 that include corner areas 38 and non-corner areas 40 of the imaging surface 32. Light sources 30 are preferably arranged around the corner areas 38 of the imaging surface 32 for illuminating the original 34 positioned on the imaging surface 32. Since there are no light sources 30 disposed at the non-corner areas 40 of the imaging surface 32, the corner areas 38 of the imaging surface 32 are illuminated more brightly than the non-corner areas 40 of the imaging surface 32. In one embodiment, the illumination of corner areas 38 is greater than the illumination of the non-corner areas 40 such that a photo response non-uniformity (PRNU) level of between 10% and 50% is achieved at an imaging member 60 (FIG. 3). In another embodiment the light sources 30 may also include red, green, and blue light emitting diodes (LEDs).

FIG. 3 illustrates an imaging unit 50 disposed within the housing 12 of the scanning device 10. The imaging unit 50 is capable of capturing an image of the original 34 positioned on the imaging surface 32.

The imaging unit 50 includes a lens 52 positioned below the imaging surface 32. The lens 52 includes a lens 52a facing the imaging surface 32. The lens 52a receives light representative of the image of the original 34 positioned on the imaging surface 32. The lens 52a has a field of view that includes an image area 54 of the imaging surface 32. In one embodiment, a field of view angle 56 of the lens 52a is preferably equal to or greater than 50 degrees. The distance between the lens 52a and the original 34 positioned on the imaging surface 32 is referred to as a front focal length 58. In one preferred embodiment, the front focal length 58 is less than 500 mm and more preferably between 200 mm and 500 mm. The lens 52a may be a wide-angled lens or a fisheye lens, among others.

As shown, light traveling from the corner areas 38 of the imaging surface 32 has further to travel to reach the lens 52a than the light from the non-corner areas 40 of the imaging surface 32. This difference in distance causes light originating from the corner areas 38 of the imaging surface 32 reaching the lens 52a to be of lesser intensity compared to light originating from the non-corner areas 40 of the imaging surface 32 reaching the lens 52a. The present invention alleviates this problem by adjusting the illumination of the corner areas 38 by illuminating the corner areas 38 of the imaging surface 32 more brightly than the non-corner areas 40 of the imaging surface 32, causing the light originating from the corner areas 38 reaching the lens 52a to be of same intensity as light originating from the non-corner areas 40 reaching the lens 52a. In one form the plurality of light sources 30 illuminate the corner areas 38 at least 40 percent greater than the non-corner areas 40.

The imaging unit 50 also includes the imaging member 60 positioned below the lens 52, which captures the image of the original 34. The lens 52 includes a lens 52b that focuses the image of the original 34 on the imaging member 60. The distance between the lens 52b and the imaging member 60 is referred to as a back focal length 62. In one embodiment, the back focal length 62 is preferably at least 4 mm. The imaging member 60 may be an area array sensor. In one embodiment, the imaging member 60 is preferably a monochromatic imaging member.

Light rays representing the image of the original 34 from the lens 52b strike the imaging member 60 at an angle that is referred to as the chief ray angle (CRA) 64. The response of the imaging member 60 changes with the change in the CRA 64. Since the CRA 64 changes considerably from a center of the imaging member 60 to a corner of the imaging member 60, the response of the imaging member 60 is different in the corner of the imaging member than at the center of the imaging member. This causes a non-uniform response at the imaging member 60 that is undesired. Illuminating the corner areas 38 of the imaging surface 32 more brightly than the non-corner areas 40 of the imaging surface 32 as in the present invention addresses the problem of variable response at the imaging member 60 and ensures that the image of the original 34 appears uniformly illuminated at the imaging member 60. A measurement of this uniformity at the imaging member 60 is referred to as "photo response non-uniformity" or PRNU. In one embodiment, a PRNU level of between 10% and 50% is achieved at the imaging member 60.

Figure 4A:
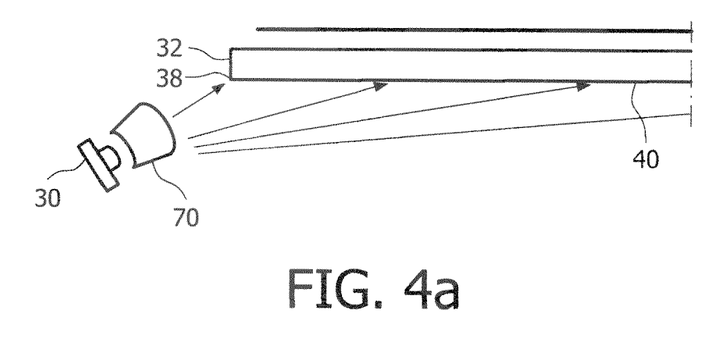
FIGS. 4a-4b are schematic diagrams of light sources arranged around the corner areas of the imaging surface that has a light diverging lens positioned in front of the light sources according to one embodiment of the present invention.
Figure 4B:
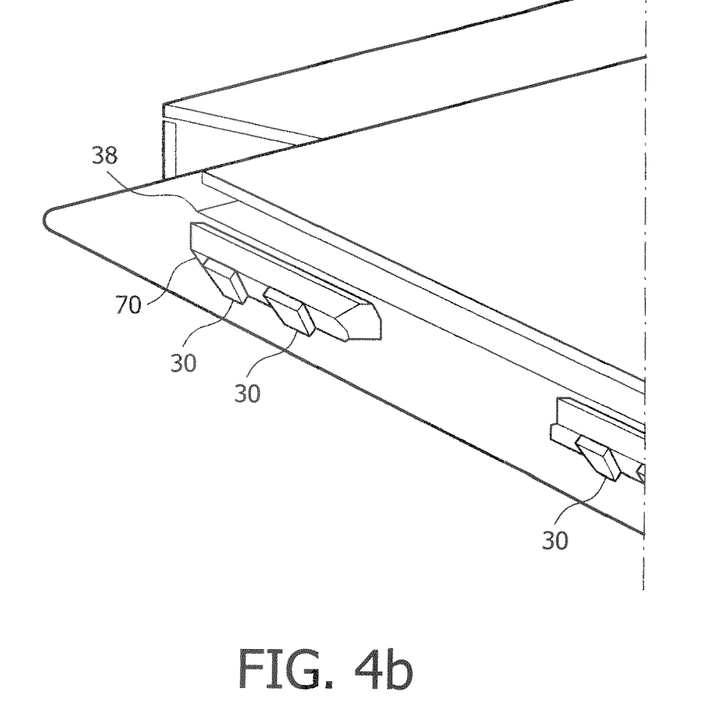

FIG. 4a-4b illustrate a second embodiment of the arrangement of the light sources 30 arranged around the imaging surface 32. A diverging lens 70 is positioned in front of each the light source 30. The diverging lens 70 diverges the light from the light sources 30 such that the corner areas 38 of the imaging surface 32 are more brightly illuminated than the non-corner areas 40 of the imaging surface 32. In one form the plurality of light sources 30 are adjusted to illuminate the corner areas 38 at least 40 percent greater than the non-corner areas 40.

Figure 5:
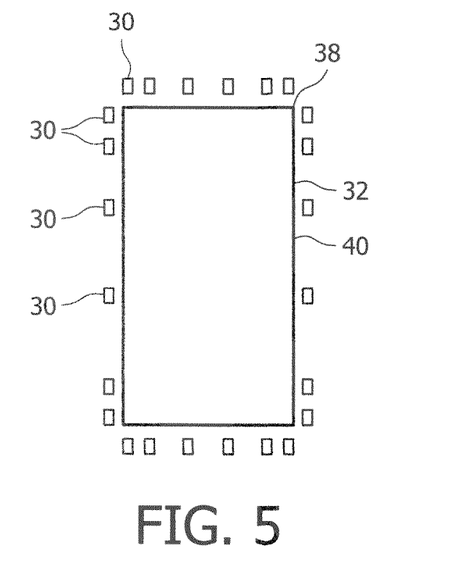
FIG. 5 is a schematic diagram of an arrangement of light sources that has more light sources at the corner areas of the imaging surface than at the non-corner areas of the imaging surface according to one embodiment of the present invention.

FIG. 5 illustrates a third embodiment of the arrangement of light sources 30 arranged around the imaging surface 32. A first plurality of light sources 30 are arranged around the corner areas 38 of the imaging surface 32 and a second plurality of light sources 30 are arranged around the non-corner areas 40 of the imaging surface 32. The density of the first plurality of light sources 30 is greater than the density of the second plurality of light sources 30. In one embodiment the plurality of light sources 30 are adjusted to illuminate the corner areas 38 of the imaging surface 32 to a greater extent than the non-corner areas 40 of the imaging surface 32 until a PRNU level of between 10% and 50% is achieved at the imaging member 60.

Figure 6:
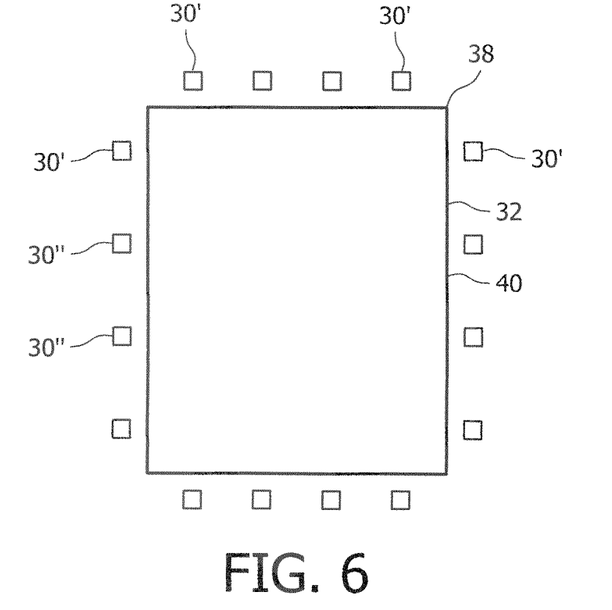
FIG. 6 is a schematic diagram of an arrangement of light sources that has higher luminance light sources at the corner areas of the imaging surface than at the non-corner areas of the imaging surface according to one embodiment of the present invention.

FIG. 6 illustrates a fourth embodiment of the arrangement of two pluralities of light sources 30' and 30" arranged around the imaging surface 32. The first plurality of light sources 30' are arranged around the corner areas 38 of the imaging surface 32 and the second plurality of light sources 30" are arranged around the non-corner areas 40 of the imaging surface 32. The first plurality of light sources 30' have a first lumen value that is greater than a second lumen value of the second plurality of light sources 30". In one embodiment, the light sources 30' and 30" are uniformly arranged around the imaging surface 32 and the number of first plurality of light sources 30' is equal to the number of second plurality of light sources 30". In one embodiment, the second plurality of light sources 30" preferably illuminates the corner areas 38 of the imaging surface with the illumination of the corner areas 38 adjusted to be greater than the non-corner areas 40 of the imaging surface 32 until a PRNU level of between 10% and 50% is achieved at the imaging member 60.

Figure 7:
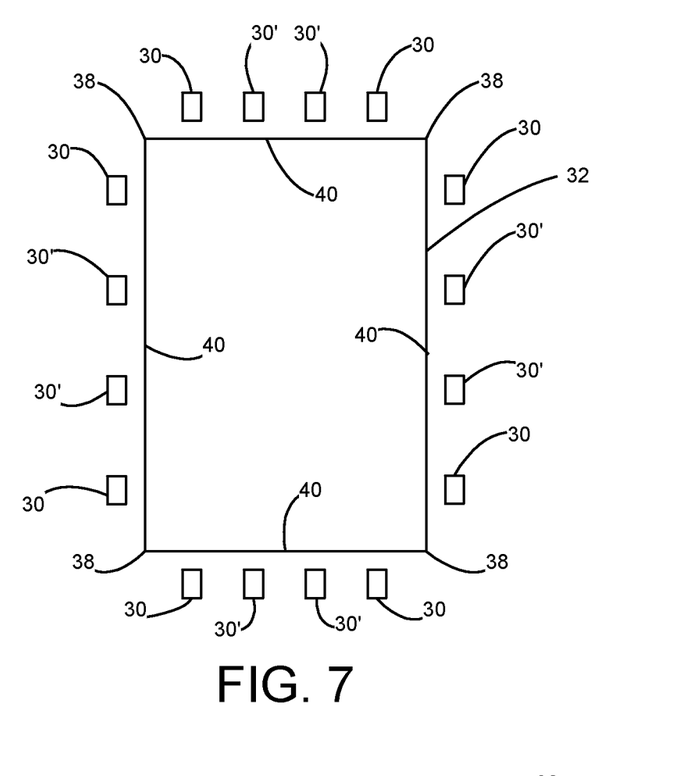
FIG. 7 is a schematic diagram of an arrangement of light sources that has higher number of light sources directed towards the corner areas of the imaging surface than at the non-corner areas of the imaging surface according to one embodiment of the present invention.

FIG. 7 illustrates a fifth embodiment of the arrangement of light sources 30 arranged around the imaging surface 32. A first plurality of light sources 30 are focused at the corner areas 38 of the imaging surface 32 and a second plurality of light sources 30' are focused at the non-corner areas 40 of the imaging surface 32. The second plurality of light sources 30' illuminate the corner areas 38 of the imaging surface 32 such that the illumination of the corner areas 38 is greater than the non-corner areas 40 of the imaging surface 32 such that a PRNU level of between 10% and 50% is achieved at the imaging member 60. In one embodiment, the first and second plurality of light sources 30 and 30' are uniformly arranged around the imaging surface 32 and the number of first plurality of light sources 30 is equal to the number of second plurality of light sources 30'.

Figure 8:
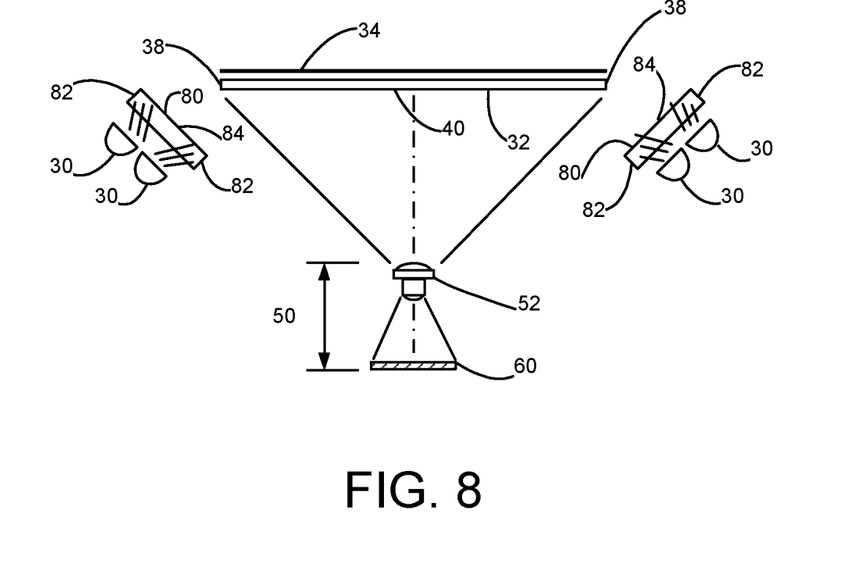
FIG. 8 is a schematic diagram of an imaging unit of an imaging device that has light sources disposed outside a field of view of a lens of an imaging unit according to one embodiment of the present invention.
Figure 9:
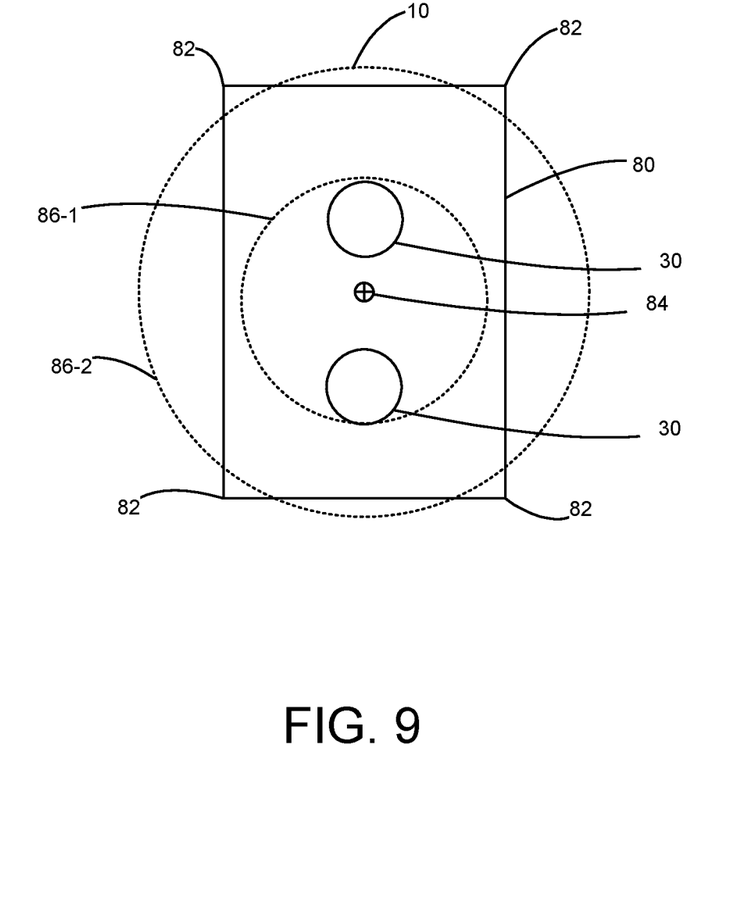
FIG. 9 is a schematic diagram of a lens disposed in front of the light sources of FIG. 8.

FIGS. 8-9 illustrate a sixth embodiment of the arrangement of light sources 30. An imaging unit 50 is positioned below the imaging surface 32 for capturing an image of the original 34 positioned on the imaging surface 32. The imaging unit 50 includes a lens 52 that focuses the image of the original to an imaging member 60. A plurality of light sources 30 are positioned adjacent the corner areas outside the field of view of the lens 52 for illuminating the original 34 positioned on the imaging surface 38. A lens 80 is positioned in front of a plurality of light sources 30. The lens 80 has an inherent property of focusing light around the corner area 82 of the lens 80 than in the center 84, designated by the circle with a cross, of the lens 80. Due to this property of the lens 80, the light from the plurality of light sources 30 is focused at the corner areas 38 of the imaging surface. In FIG. 9, dotted circles, designated 86-1 and 86-2, illustrate the focusing by lens 80 of the light beams from the plurality of light sources 30 about the corner areas 82 of lens 80. As viewed in FIG. 9 the plurality of light sources 30 are beneath lens 80. In one embodiment, the illumination of the corner areas 38 of the imaging surface 32 is adjusted to be greater than the illumination of the non-corner areas 40 of the imaging surface 32 until a PRNU level of between 10% and 50% is achieved at the imaging member 60. In one embodiment the lens 80 is a flat top lens.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A system for non-uniformly illuminating and imaging an original in an imaging device, the system comprising:
   an imaging surface for holding the original, the imaging surface having a perimeter, corner areas, and non-corner areas;
   an imaging member for capturing an image of the original placed on the imaging surface;
   a plurality of light sources arranged around the perimeter of the imaging surface for non-uniformly illuminating the original placed on the imaging surface, the plurality of light sources illuminating the corner areas of the imaging surface with the illumination of the corner areas being adjusted until a photo response non-uniformity (PRNU) level of between 10% and 50% is achieved at the imaging member; and
   a lens disposed below the imaging surface and above the imaging member, the lens having a field of view angle equal to or greater than 50 degrees and a focal length equal to or greater than 200 mm and less than 500 mm.

2. The system according to claim 1, the plurality of light sources comprising a first plurality of light sources illuminating the corner areas of the imaging surface and a second plurality of light sources illuminating the non-corner areas of the imaging surface, the first plurality of light sources having a higher number of light sources compared to the second plurality of light sources wherein the illumination of the corner areas by the first plurality of light sources is greater than the illumination of the non-corner areas by the second plurality of light sources.

3. The system according to claim 1, the plurality of light sources comprising a first plurality of light sources illuminating the corner areas of the imaging surface and a second plurality of light sources illuminating the non-corner areas of the imaging surface, the first plurality of light sources having a first lumens output greater than a second lumens output of the second plurality of light sources wherein the illumination of the corner areas by the first plurality of light sources is greater than the illumination of the non-corner areas by the second plurality of light sources.

4. The system according to claim 1, wherein the plurality of light sources are arranged uniformly around the perimeter of the imaging surface.

5. The system according to claim 1, wherein the imaging member is a monochromatic imaging member.

6. The system according to claim 1, wherein the plurality of light sources are controllable to focus illumination on a particular location on the imaging surface.

7. The system according to claim 6, wherein the plurality of light sources are arranged uniformly around a perimeter of the imaging surface.

8. The system according to claim 1, wherein the plurality of light sources includes a red LED, a green LED, and a blue LED.

9. The system according to claim 1, wherein the plurality of light sources illuminate the corner areas at least 40 percent greater than the non-corner areas.

10. A system for non-uniformly illuminating and imaging an original in an imaging device, the system comprising:
- an imaging surface for holding the original, the imaging surface having a perimeter, corner areas, and non-corner areas;
- a lens positioned below the imaging surface, the lens having a field of view that includes an entire area of the imaging surface;
- a plurality of light sources disposed adjacent the imaging surface outside the field of view of the lens, the plurality of light sources oriented towards the imaging surface for illuminating the original placed on the imaging surface;
- an imaging member positioned below the lens for capturing an image of the illuminated original placed on the imaging surface; and
- a lens positioned on the plurality of light sources and operative to diverge light from the plurality of light sources to illuminate the corner areas of the imaging surface with the illumination of the corner areas being adjusted until a photo response non-uniformity (PRNU) level of between 10% and 50% is achieved at the imaging member.

11. The system according to claim 10, wherein the illumination by the plurality of light sources at the corner areas is at least 40% greater than at the non-corner areas.

12. A method for non-uniformly illuminating and imaging an original in an imaging device, the method comprising:
- positioning the original on an imaging surface having a perimeter, corner areas, and non-corner areas;
- non-uniformly illuminating the original using a plurality of light sources arranged around the perimeter of the imaging surface; and
- capturing an illuminated image of the original, the plurality of light sources illuminating the corner areas of the imaging surface with the illumination of the corner areas being adjusted until a photo response non-uniformity (PRNU) level of between 10% and 50% is achieved at an imaging member.

13. The method according to claim 12, wherein the plurality of light sources includes a red LED, a green LED, and a blue LED.

14. The method according to claim 12, wherein adjusting the illumination of the corner areas of the imaging surface comprises having the plurality of light sources illuminate the corner areas at least 40% greater than the non-corner areas.

15. The method according to claim 12, wherein illuminating the original using the plurality of light sources comprises illuminating the corner areas of the imaging surface with a first plurality of light sources at a first lumens output and illuminating the non-corner areas of the imaging surface with a second plurality of light sources at a second lumens output, wherein the first lumens output is greater than the second lumens output and is adjusted until the photo response non-uniformity (PRNU) level of between 10% and 50% is achieved at the imaging member.

16. The method according to claim 15, wherein a number of the first plurality of light sources is equal to a number of the second plurality of light sources.

17. The method according to claim 12, further comprising uniformly positioning the plurality of light sources around the perimeter of the imaging surface.

18. The method according to claim 12, wherein non-uniformly illuminating the original using the plurality of light sources further comprises illuminating the original by providing greater illumination at the corner areas than at the non-corner areas of the imaging surface.

19. The method according to claim 18, wherein capturing the illuminated image of the original further comprises receiving light reflected from the corner areas and light reflected from the non-corner areas at substantially the same intensity at a lens disposed below the imaging surface and above the imaging member, and providing, by the lens, the received light from the corner areas and non-corner areas substantially uniformly to the imaging member such that the PRNU level of between 10% and 50% is achieved at the imaging member.

20. The method according to claim 19, wherein the lens comprises a fisheye lens.

* * * * *